United States Patent
Nelson et al.

(10) Patent No.: US 9,669,587 B2
(45) Date of Patent: *Jun. 6, 2017

(54) STAGED COCURING OF COMPOSITE STRUCTURES

(71) Applicant: The Boeing Company, Chicago, IL (US)

(72) Inventors: Karl M. Nelson, Issaquah, WA (US); Joseph L. Hafenrichter, Seattle, WA (US); Kurtis S. Willden, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/269,157

(22) Filed: May 4, 2014

(65) Prior Publication Data

US 2014/0318693 A1    Oct. 30, 2014

Related U.S. Application Data

(63) Continuation of application No. 12/274,092, filed on Nov. 19, 2008, now Pat. No. 8,834,668.

(51) Int. Cl.
*B29C 65/00* (2006.01)
*B29C 70/34* (2006.01)
(Continued)

(52) U.S. Cl.
CPC .......... *B29C 70/34* (2013.01); *B29C 35/0266* (2013.01); *B29C 35/0288* (2013.01); *B29C 65/18* (2013.01); *B29C 65/4835* (2013.01); *B29C 65/5042* (2013.01); *B29C 65/785* (2013.01); *B29C 66/112* (2013.01); *B29C 66/118* (2013.01); *B29C 66/1122* (2013.01); *B29C 66/1142* (2013.01);
(Continued)

(58) Field of Classification Search
CPC ... B29C 66/131; B29C 66/474; B29C 66/532; B29C 66/73753; B29C 66/73754; B29C 35/0266; B29C 35/0288; B29C 70/34; B29D 99/0014
See application file for complete search history.

(56) References Cited

U.S. PATENT DOCUMENTS 3,346,220 A * 10/1967 Lemelson ............... B29C 41/36
                                                   165/170
4,086,378 A    4/1978  Kam et al.
(Continued)

FOREIGN PATENT DOCUMENTS

FR    2909919 A1 *  6/2008  ............. B29C 65/02
JP    EP 1547753 A1 *  6/2005  ........... B29C 53/083

OTHER PUBLICATIONS

Office Action, dated Feb. 22, 2011, regarding U.S. Appl. No. 12/274,092, 13 pages.
(Continued)

*Primary Examiner* — John Goff
(74) *Attorney, Agent, or Firm* — Yee & Associates, P.C.

(57) ABSTRACT

A composite structure is fabricated by staging at least a portion of an uncured, first composite component. The first composite component is assembled with a second composite component, and the staged portion of the first composite component is cocured with the second composite component.

15 Claims, 10 Drawing Sheets

(51) Int. Cl.
- B29C 35/02 (2006.01)
- B29C 65/18 (2006.01)
- B29C 65/50 (2006.01)
- B29C 65/78 (2006.01)
- B29D 99/00 (2010.01)
- B29C 65/48 (2006.01)
- B32B 37/18 (2006.01)
- B29K 105/24 (2006.01)
- B29L 31/00 (2006.01)
- B29L 31/30 (2006.01)

(52) U.S. Cl.
CPC ........ *B29C 66/1162* (2013.01); *B29C 66/131* (2013.01); *B29C 66/14* (2013.01); *B29C 66/301* (2013.01); *B29C 66/432* (2013.01); *B29C 66/474* (2013.01); *B29C 66/524* (2013.01); *B29C 66/5221* (2013.01); *B29C 66/532* (2013.01); *B29C 66/721* (2013.01); *B29C 66/73751* (2013.01); *B29C 66/73752* (2013.01); *B29C 66/73753* (2013.01); *B29C 66/73754* (2013.01); *B29C 66/73941* (2013.01); *B29C 66/81431* (2013.01); *B29C 66/8244* (2013.01); *B29C 66/83221* (2013.01); *B29C 66/843* (2013.01); *B29C 66/8432* (2013.01); *B29D 99/0014* (2013.01); *B32B 37/18* (2013.01); *B29C 66/232* (2013.01); *B29C 66/4326* (2013.01); *B29C 66/61* (2013.01); *B29K 2105/243* (2013.01); *B29L 2031/003* (2013.01); *B29L 2031/008* (2013.01); *B29L 2031/3082* (2013.01); *B29L 2031/3085* (2013.01); *Y10T 156/1002* (2015.01); *Y10T 428/31504* (2015.04)

(56) References Cited

U.S. PATENT DOCUMENTS

| | | | | |
|---|---|---|---|---|
| 4,416,349 | A * | 11/1983 | Jacobs | G10K 11/16 181/208 |
| 4,683,018 | A | 7/1987 | Sutcliffe et al. | |
| 5,110,656 | A | 5/1992 | Inaba et al. | |
| 5,554,667 | A | 9/1996 | Smith et al. | |
| 5,672,311 | A | 9/1997 | May et al. | |
| 7,306,692 | B2 * | 12/2007 | Graham | B29C 66/1122 156/285 |
| 8,834,668 | B2 * | 9/2014 | Nelson | B29C 35/0266 156/307.1 |
| 2003/0075259 | A1 * | 4/2003 | Graham | B29C 66/1122 156/94 |
| 2005/0183816 | A1 * | 8/2005 | Ilzhoefer | B29C 70/54 156/272.2 |
| 2006/0108058 | A1 | 5/2006 | Chapman et al. | |
| 2010/0147460 | A1 * | 6/2010 | Lefebure | B29C 65/02 156/307.1 |
| 2010/0252180 | A1 | 10/2010 | Rincon et al. | |

OTHER PUBLICATIONS

Final Office Action, dated Aug. 26, 2011, regarding U.S. Appl. No. 12/274,092, 17 pages.
Office Action, dated Dec. 18, 2013, regarding U.S. Appl. No. 12/274,092, 26 pages.
Final Office Action, dated Mar. 4, 2014, regarding U.S. Appl. No. 12/274,092, 15 pages.
Notice of Allowance, dated May 20, 2014, regarding U.S. Appl. No. 12/274,092, 7 pages.

* cited by examiner

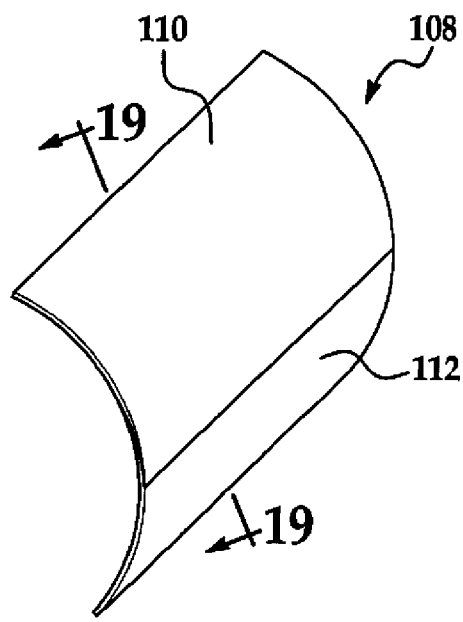
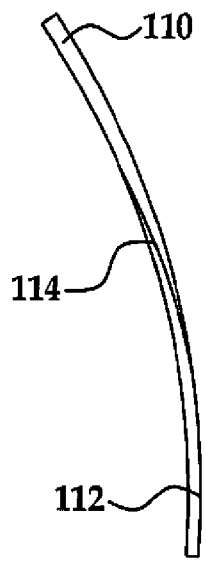
FIG. 18
FIG. 19
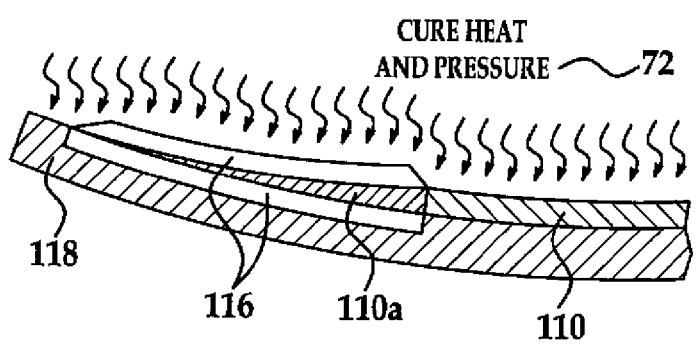
FIG. 20
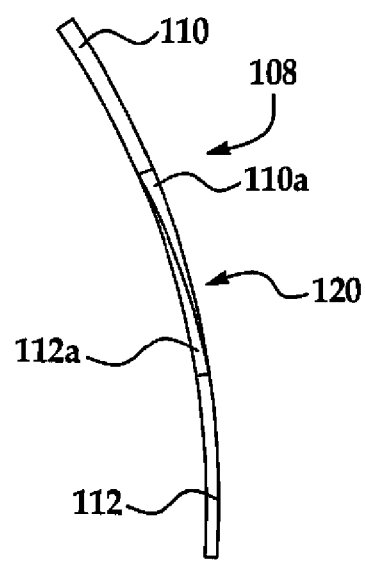
FIG. 21

STAGED COCURING OF COMPOSITE STRUCTURES

This application is a continuation of application Ser. No. 12/274,092, filed Nov. 19, 2008 now U.S. Pat. No. 8,834,668.

TECHNICAL FIELD

This disclosure generally relates to techniques for fabricating and assembling composite structures, and deals more particularly with a method and apparatus for fabricating composite structures using composite components that are cured in stages.

BACKGROUND

A variety of techniques are known for fabricating and assembling composite structures using composite components. These techniques may include bonding cured components together, co-bonding of cured components to an uncured composite component, cocuring of uncured components and the use of fasteners to assemble cured components. The cocuring technique may involve cocuring uncured components that are held in alignment with each other by cure tooling which may be relatively complex. The assembled components and the cure tooling may be vacuum bagged and then cured together though the application of elevated temperatures and pressures, often within an autoclave. The cocuring technique is labor and tool intensive, and may also require relatively expensive capital equipment such as an autoclave. Moreover, in order to produce composite structures having the requisite quality for higher performance applications, precise alignment and process controls may be required.

Accordingly, there is a need for a method and apparatus for fabricating composite structures using cocured components that overcomes the deficiencies discussed above.

SUMMARY

The disclosed embodiments provide a method and related apparatus for fabricating a wide variety of unitized composite structures utilizing components that have selective areas that are cured in stages. The disclosed embodiments may be particularly useful in fabricating composite subassemblies used in aircraft, such as fuselages, wings, empennages, skins, ribs, spars and/or stringers, to name only a few. Unlike known cocuring techniques in which composite component are fully assembled and then cocured into a consolidated structure, the disclosed embodiments provide a method of curing portions of the components in stages, such that at some intermediate step they may have cured, partially-cured and/or uncured areas. The cured areas of the components provide the components with sufficient rigidity to allow them to be handled and then located in final assembly alignment using a minimum of tooling and fixturing. Because the partially-cured or staged components are stable and rigid at room temperature, they may be transported and stored until needed, thus providing added flexibility in the assembly process.

The fully cured areas of the staged components act as reference surfaces that may be used in locating other matching components of an assembly, thereby greatly simplifying the required tooling. After the components have been aligned relative to each other, the mating surfaces of the staged areas may be brought to a full cure using controlled heat and pressure using any of a variety of methods. The staged portions of the components exhibit plastic behavior once heated sufficiently above their glass transition temperature, thus allowing the mating surfaces to deform so as to conform to each other during the final curing process.

According to one disclosed embodiment, a method is provided for fabricating a composite structure. First and second composite layups are formed, and at least a first portion of the first layup is staged. The layups are then assembled by bringing the staged first portion of the first layup into contact with the second layup. The staged first portion of the first layup is cocured with the second layup.

According to another embodiment, a method of fabricating a composite structure. At least a first portion of an uncured, first composite component is staged. The staged first composite component is assembled with a second composite component and, the first and second composite components are then cocured.

In accordance with still another embodiment, apparatus is provided for fabricating a composite component. The apparatus includes a cure tool on which a uncured ply layup may be placed for staging at least a portion of the layup. Means are provided for heating the layup, and for controlling the amount of heat applied to the staged portion of the layup.

According to a further embodiment, apparatus is provided for fabricating a composite structure comprising a first tool and a second tool for respectively staging first portions of each of first and second composite ply layups. A third tool is used in cocuring the staged first portions of the first and second layups.

BRIEF DESCRIPTION OF THE ILLUSTRATIONS

FIG. 18 is a perspective view illustrating a section of an aircraft fuselage skin formed from cocured skin components.

FIG. 19 is a sectional view taken along the line 19-19 in FIG. 18.

FIG. 20 is a sectional view illustrating the cure tooling used to selectively stage the skin components shown in FIGS. 18 and 19.

FIG. 21 is a sectional view illustrating the staged skin components having been assembled along their mating surfaces in preparation for cocuring.

DETAILED DESCRIPTION

Figure 1:
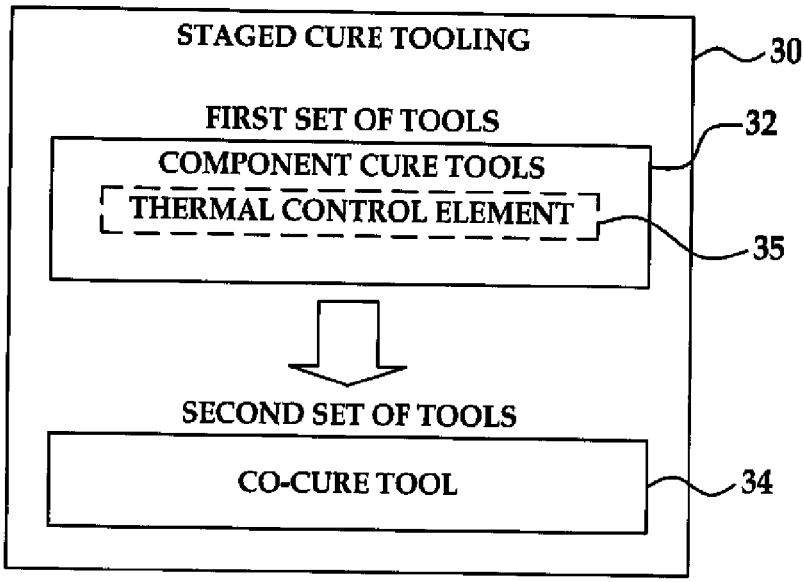
FIG. 1 is a functional block diagram of staged cure tooling employed in a method of fabricating composite structures using staged components.
Figure 3:
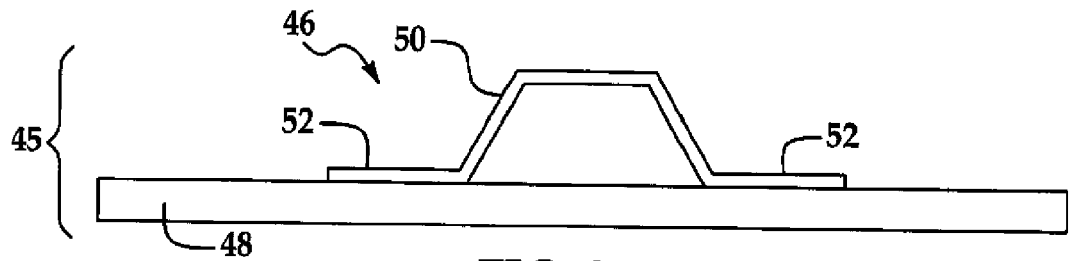
FIG. 3 is a cross sectional view of a hat shaped stringer cocured with a laminate skin.

Referring first to FIGS. 1 and 3, staged cure tooling 30 is employed to fabricate a unitized, composite structure 45 using staged components which, in the illustrated example, comprises a hat shaped stringer 46 and a simply contoured composite skin 48 such as that used in the fabrication of aircraft. The staged cure tooling 30 may be used in a later discussed method for fabricating composite structures in which the curing of the individual composite components is performed in stages. As used herein, "staged" refers to an intermediate state of the prepreg after some amount of temperature and time has advanced the cure of the resin to a point where it is not fully cured but is largely or fully consolidated and may act as a vitreous solid at room temperatures, but may soften and act as a plastic at higher temperatures. Ideally a staged laminate has no voids, and may be fully consolidated. The glass transition temperature of the staged laminate is greater than room temperature, and thus the resin material may act as a glassy solid at or below room temperature.

Once the staged laminate is heated above its glass transition temperature such as, for example and without limitation, approximately 120 degrees F., the material becomes soft and pliable, and may be deformed plastically, although with limitations due to wrinkling and unwanted distortions. Furthermore, as used herein, "staged component" refers to a composite component that has areas or regions that are staged and may also have fully-cured or uncured portions. As referred to herein, a staged component may be considered as being in an intermediate stage of the fabrication process.

The staged cure tooling 30 may include component cure tools 32 whose construction details will vary depending upon the application and may be used to form a composite layup (not shown) into a desired shape as well as to cure portions of the component. In order to avoid fully curing other selected portions of a component, the cure tools 32 may include thermal control elements 35 that may be active, or passive heat sinks 35 which absorb heat applied to cure the component, and thus isolate the selected portions of the component so that they become staged. Following staging of the components using the cure tools 32, the components may be assembled and placed in a cocure tool 34 which may hold the staged components in alignment while heat and pressure are applied to the staged portions of the components in order to cocure the assembled components into a unitized structure.

Figure 2:
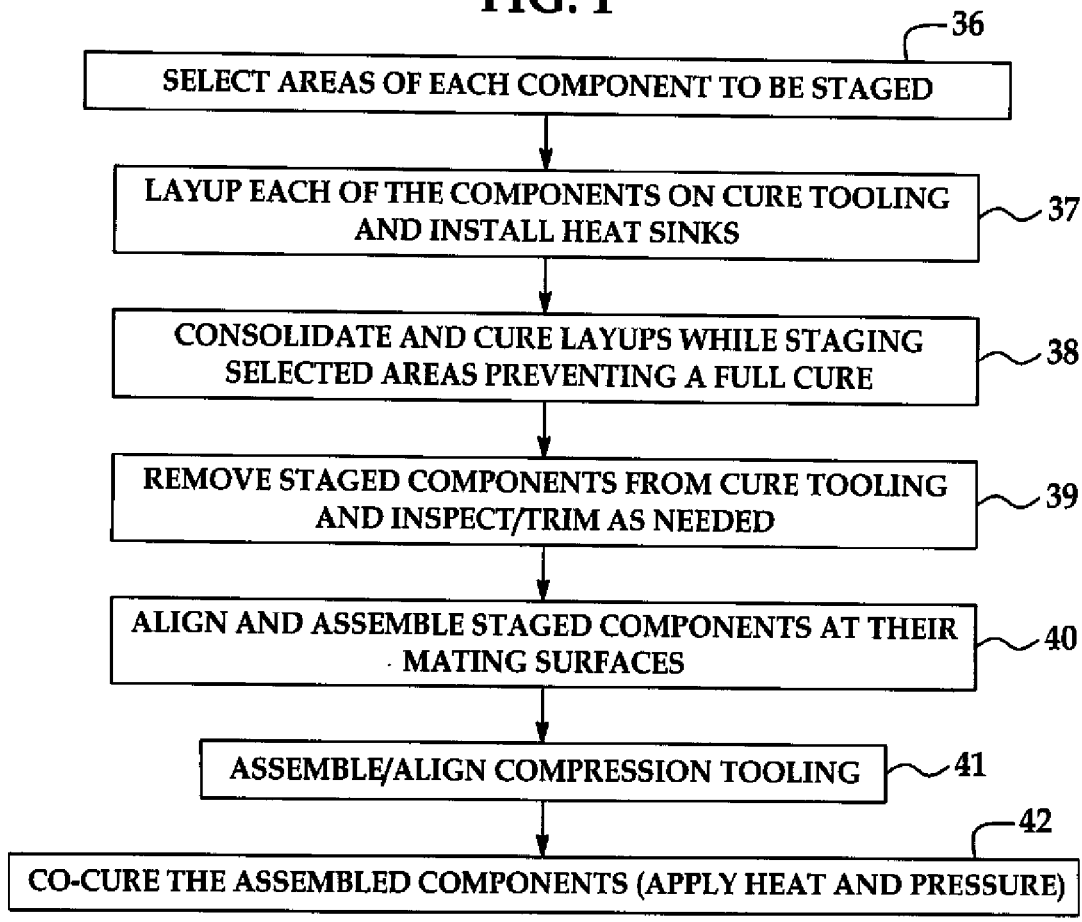
FIG. 2 is a flow diagram broadly illustrating the method.

Referring now also to FIG. 2, the method of fabricating a composite structure using staged components begins at step 36 in which the areas of each component that are to be staged are selected. Next, at 37, a composite layup of prepreg plies for each of the components is placed on cure tooling 32 and thermal control elements 35 are installed surrounding those portions of the layup that are to be staged. At step 38, the layups are cured using the application of heat and pressure while protecting the selected areas of the components against fully-curing using the thermal control elements 35. At 39, the staged components are removed from the cure tooling 32 and inspected/trimmed, as needed.

In some applications, the entirety of the component may be staged to a uniform degree. In such applications, thermal control elements 35 may not be required as the cure cycle may be modified in order to effect the desired amount of staging through the manipulation of time and temperature. In other applications, one component may be staged whereas another component in the assembly may be uncured. It may also be possible to cocure a first staged composite component with a second, fully cured component. Thus, various combinations of staged, cured or uncured components or regions on a particular component may be assembled together and cocured.

Next, at step 40, the staged components are aligned and assembled with the staged mating surfaces of the components engaging each other. At step 41, the assembled components are aligned within the cocure tool 34 which, as will be discussed later, may comprise for example and without limitation, a compression mold (not shown). As shown at 42, the cocure tool 34 is used to apply heat and pressure to the uncured mating surfaces of the components, thereby cocuring the components to form a fully consolidated, unitized composite structure.

Figure 4:
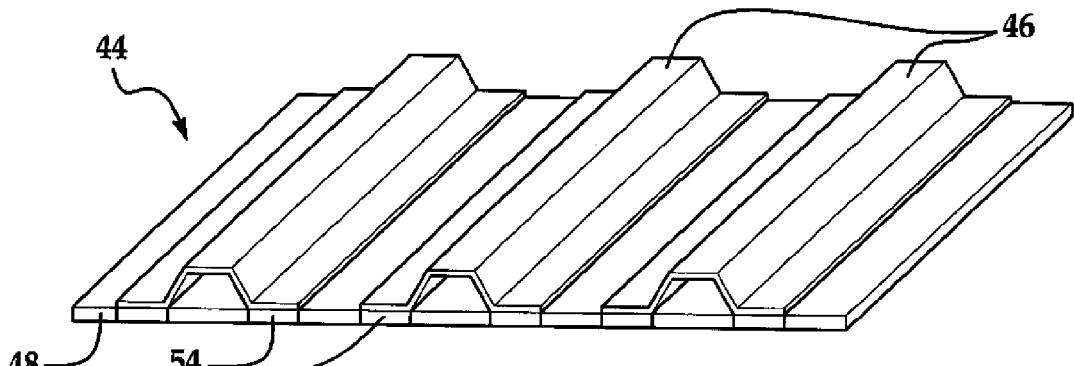
FIG. 4 is a perspective view illustrating multiple stringers showing the areas of staging, and cocured on a skin.

Referring now to FIGS. 3 and 4, as previously mentioned, a composite structure 45 may comprise, for example and without limitation, a hat shaped stringer 46 used to stiffen a composite laminate skin 48. The stringer includes a hat shaped section 50 and a pair of oppositely extending flanges 52 which are joined to and cocured with the skin 48. As will be described in more detail below, selected areas (or their entirety) of the stringer 46 and skin 48 remain staged in the areas where they are to be joined as indicated by the numeral 54 in FIG. 4, and these staged areas 54 are later cocured to create a unitized structure 45.

Figure 5:
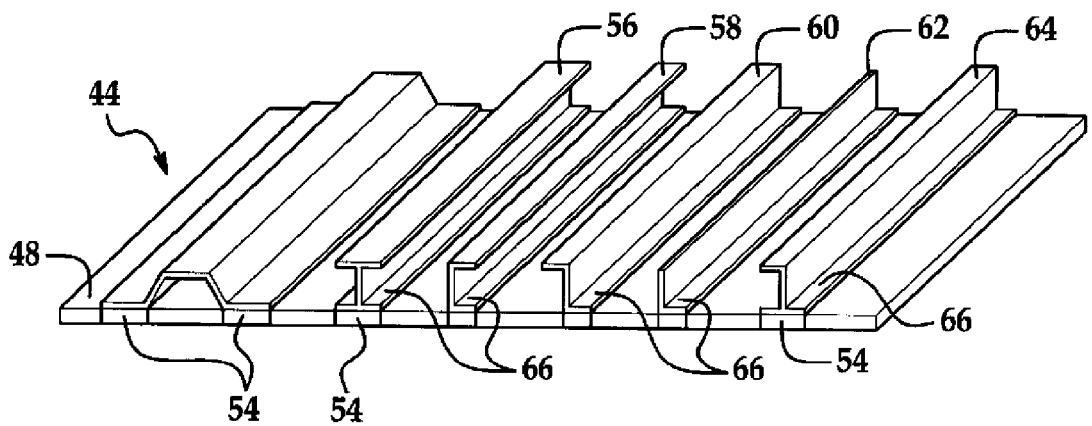
FIG. 5 is a view similar to FIG. 4 but illustrating a variety of beam components that may be staged and cocured with a skin.

In the illustrated example, the stringer 46 is used to stiffen the skin 48, however, as shown in FIG. 5, various other stiffening members may be employed such as an I-shape beam 56, a U-shape beam 58, a Z-shape beam 60, an L-shape beam 62 and a modified I-beam 64. In the case of each of the beams 56-64, the staged lower flange 66 is mated to the skin 48 staged area 54 that is not cured until the beams 56-64 are later assembled onto the skin 48, which themselves may be either wholly uncured or staged, and then subsequently cocured therewith.

Figure 6:
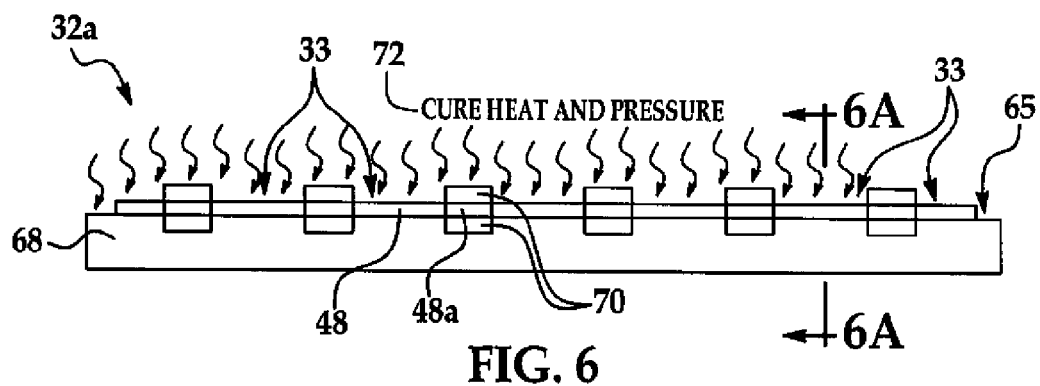
FIG. 6 is a sectional view illustrating a cure tool for staging the skin shown in FIGS. 3-5.

Attention is now directed to FIG. 6 which illustrates a typical cure tool 32a that may be used to cure selected areas 33 of a multi-ply composite layup 48 of prepreg plies. In this example, the cure tool 32a includes a cure mold 68 having a flat upper surface 65, however depending o the application, such surface 65 may be curved or contoured. A plurality of thermal sinks 70 may be partially embedded in the cure mold 68 and areas to be staged 48a of the layup 48 which lie between the areas 33 that have been selected to be fully cured. In addition to imbedded sinks, manually positioned thermal sinks may be placed in contact with the un-tooled surface of the component. The thermal sinks 70 are arranged in a manner that substantially corresponds to the intended orientation of the flanges 52 of the stringer 46 (FIG. 3).

Figure 6A:
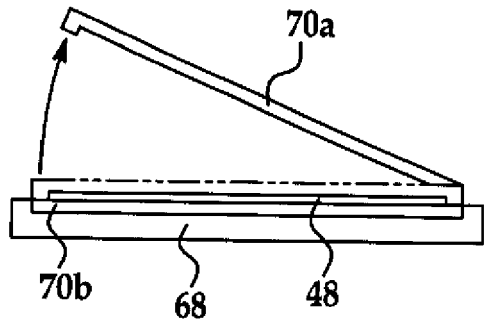
FIG. 6a is a sectional view taken along the line 6a-6a in FIG. 6, but showing one of the thermal sinks having been swung to an open position.

In one embodiment, the thermal sinks 70 may be included in the upper and lower hinged members 70a, 70b respectively, as shown in FIG. 6a, which may be swung open to allow insertion and removal of the layup 48. The thermal sinks 70 may be formed from any of a variety of suitable materials including, but not limited to copper and aluminum alloys having a relatively high thermal conductivity which provide increased thermal mass surrounding the strips 48a of the layup 48 in order to absorb heat that is applied to the layup 48 by a source 72 of heat and pressure. Such heat sinks may also be implemented as active elements, whereby the thermal sink is hollowed and a type of heat transfer fluid is employed to control the temperature to a prescribed value. For example, the assembly shown in FIG. 6 may be vacuum bagged and heated using any of various known techniques, including without limitation, the use of an oven, heat lamps, an autoclave, forced hot air, heated fluids passing through channels or tubes, or resistance heat blankets, to name only a few.

The staged elements may either be a local region on a panel, or the whole panel itself. Staging advances the cure of the resin while consolidating the panel. Thus the staged regions may have a near-zero void volume, but are not fully cured. The degree of cure can be measured by any of various known methods for determining the glass transition temperature (Tg). The glass transition temperature of the staged areas or elements would be above room temperature. Thus, the staged regions act as a hard, glassy solid at room temperature, but soften and become plastic once heated to a temperature above its Tg, while remaining consolidated. The Tg of the staged regions may be predetermined by controlling the thermal cycle that produces such a partially-cured state.

Figure 7:
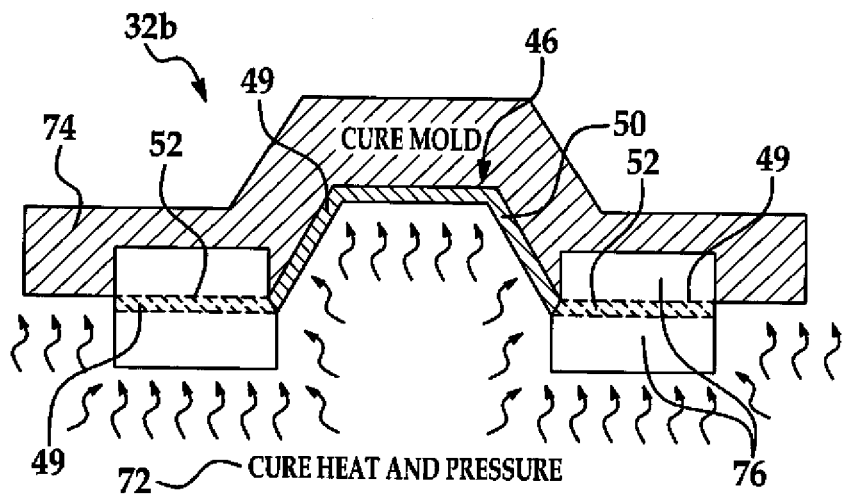
FIG. 7 is a sectional view illustrating a cure tool used to stage the stringer shown in FIGS. 3 and 4.

FIG. 7 illustrates another component cure tool 32b that is employed to form and cure the hat section 50 of a multi-ply composite layup 49 used to form the stringer 46. The layup 49 is placed in a cure mold 74 having mold surfaces for shaping the layup 49 into the shape of the stringer 46. The hat section 50 of the layup 49 is exposed to applied predetermined temperature and pressure cycle 72, and therefore achieves a full cure. However, the flanges 52 of the layup 49 are surrounded by thermal sinks 76 which are either embedded in the cure mold 74 and/or are placed in contact with the un-tooled surface of the component in order to control the temperature in these local regions of the layup 49 so that the flanges 52 become fully consolidated, yet are only partially cured or staged. In practice, the heat sinks themselves may control the temperature to a predetermined degree, thus controlling the amount of staging in specific areas of the component.

Following staging of the component layups 48, 49 using the cure tools 32a, 32b respectively, the stringer 46 and skin 48 each have cured areas, e.g. hat section 50 which are consolidated and therefore stable, while also possessing uncured (staged) portions 48a, 46a that are chemically reactive to allow subsequent moderate forming and cocuring with mating components. The glass transition temperature $T_g$ of the staged components is above room temperature, but significantly lower than value of a fully cured laminate. The glass transition temperature $T_g$ may be selected by manipulating the staging cycle described above, using a mathematical cure model to determine the extent of the staging. Following staging as described in connection with FIGS. 6 and 7, the stringer 46 and skin 48 may be inspected and trimmed, as necessary. Because of the relative rigidity of the staged) portions of the stringer and skin 48, these components may be easily handled, stacked, stored or transported while retaining their shape.

Figure 8:
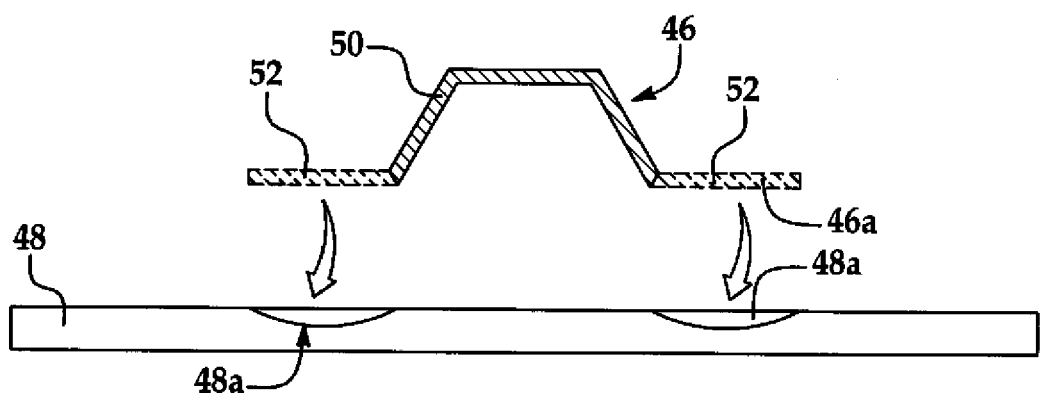
FIG. 8 is an end view showing a staged stringer being applied to a staged skin.
Figure 9:
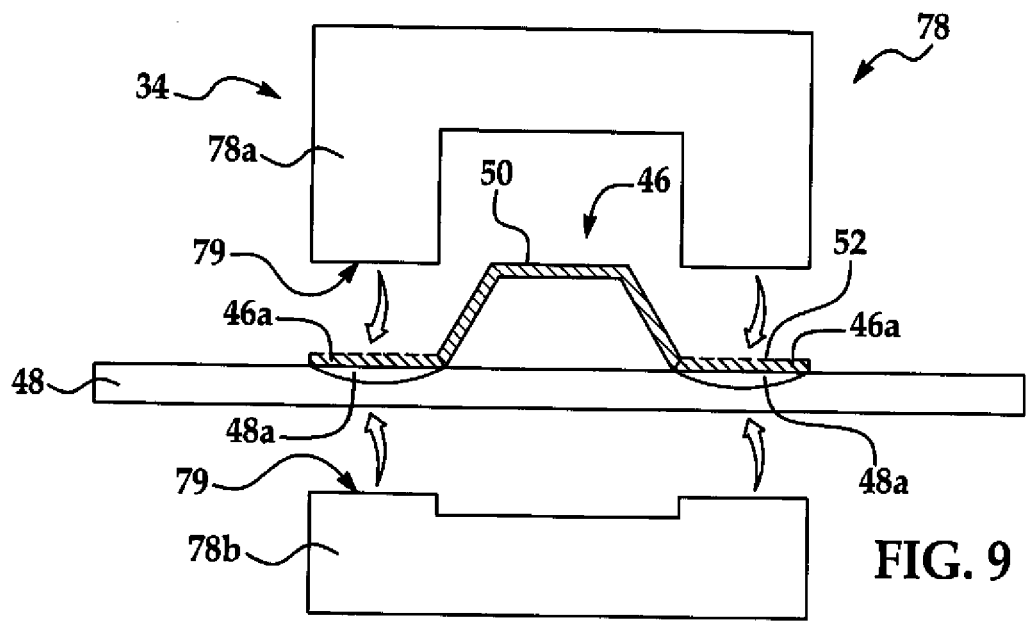
FIG. 9 is an elevational view showing the mated assembly of the stringer and skin shown in FIG. 8 having been aligned within a compression press.

FIG. 8 illustrates the locally staged stringer 46 and locally staged skin 48 following their removal from the cure tools 32a, 32b. The staged portions 46a of flanges 52 are aligned above the staged portions 48a of the skin 48 and are brought into face to face surface contact with each other in preparation for cocuring. As shown in FIG. 9, the assembled hat 46 and skin 48 are then placed within a cocure tool 34 which may include upper and lower mating cure molds 78a, 78b and may include a compression press (not shown). The molds 78a, 78b include surface areas 79 which engage the assembled stringer 46 and skin 48 in the area of the staged area 46a of uncured flanges 52 and the staged areas 48a of the skin 48. The compression mold 78 is used to apply heat and pressure to the staged, mating surfaces 46a, 48a of the stringer 46 and the skin 48, thereby cocuring these components, while the remaining portions of the assembled stringer 46 and skin 48 remain in alignment with each other as a result of having been previously cured (and thus maintained in a rigid state). It should be noted here that although a compression press has been illustrated in the Figures, various other means may be employed for applying tool pressure to the components, such as, for example and without limitation, matched molds, a mold in combination with a vacuum bag, a caul sheet in combination with a vacuum bag or a vacuum bag alone.

In certain cases, it may be possible to accomplish the alignment of the staged area of components 46, 48 using self aligning features (not shown) on cured portions of the components 46, 48. Also, depending on the application, it may be necessary or desirable to introduce adhesives (not shown) between the mating areas of the components 46, 48. The staged areas of components 46, 48 exhibit plastic behavior once heated sufficiently above their staged condition, and this plastic deformation allows the bonding surfaces to conform to each other. The staged components have latent cure or chemical reaction available which may create a strong bond between the matching surfaces. In some applications, however, it may be necessary or desirable to also use either film or paste adhesives, which may act to create a stronger, more-durable, or producible interface between matching surfaces. Furthermore, it should be recognized that it may also be necessary or desirable to employ methods, processes, treatments, etc. intended to clean, activate, and otherwise prepare surfaces for bonding in order to improve the bond and reproducibility between matching interfaces.

Figure 10:
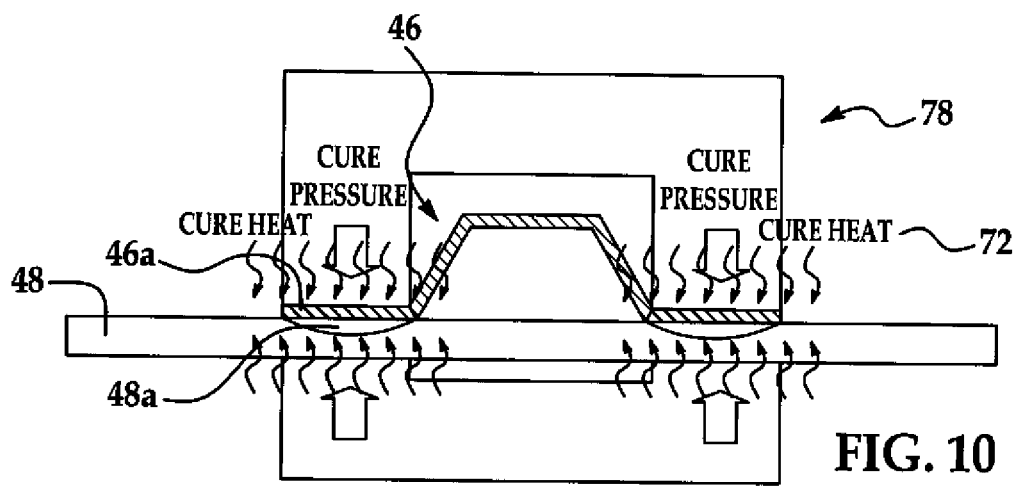
FIG. 10 is a view similar to FIG. 9 but showing the press having closed and a combination of heat and pressure being applied to the staged areas of the stringer and skin.

FIG. 10 illustrates the compression mold 78 having been closed to apply cure heat and pressure to the uncured areas 46a, 48a in order to cocure these areas and thereby form a consolidated, unitized structure 45. A variety of other methods may be used to fully-cure the staged areas of the components, depending on the application, including but not limited to, vacuum bagging within an autoclave, vacuum bagging in a non-pressurized oven, using compression clamps in a cure oven or heated hood, using magnetic clamps in a cured oven or a heated hood, or using magnetic clamps having integral heaters. Although staged cocuring can be accomplished within an autoclave, the present method makes possible the use of other curing techniques mentioned above due to the fact that the components have been staged. Within the aircraft industry for example, the method may be used to assembly and cocure a range of components, including for example and without limitation, cocuring stringers to skins; cocuring stringers to ribs; cocuring longitudinal splices between fuselage skin sections; curing circumferential splices in fuselage barrel sections; cocuring spar segments to each other; cocuring doublers to skins; and, cocuring window frames to skins.

Figure 11:
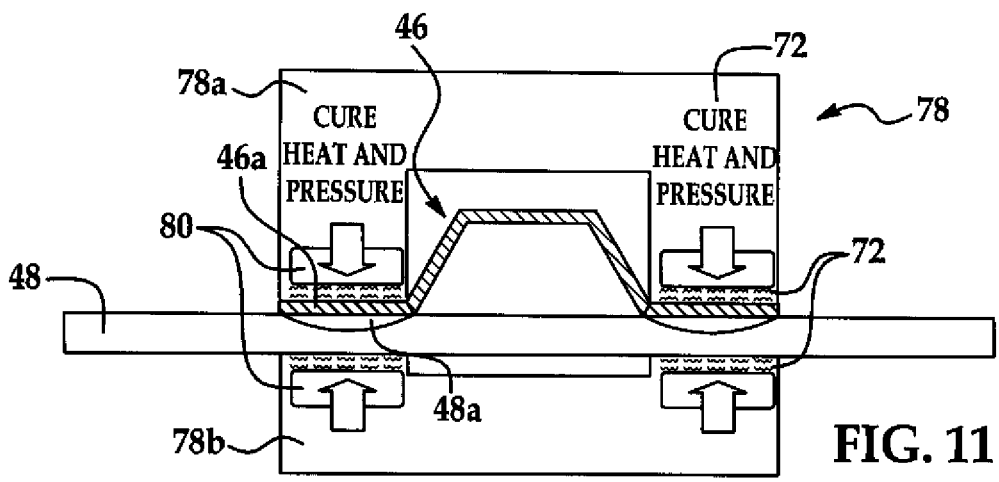
FIG. 11 is a view similar to FIG. 10 but further illustrating optional magnetic clamps for clamping the tool against the mating surfaces of the assembly.

FIG. 11 illustrates the use of magnetic clamps 80 which may be used to draw the cure molds 78a, 78b toward each other and apply pressure on the mating surfaces of the uncured areas 48a, 46a. The magnetic clamps 80 may include integral heating elements (not shown) which produce the necessary cure heat.

Figure 12:
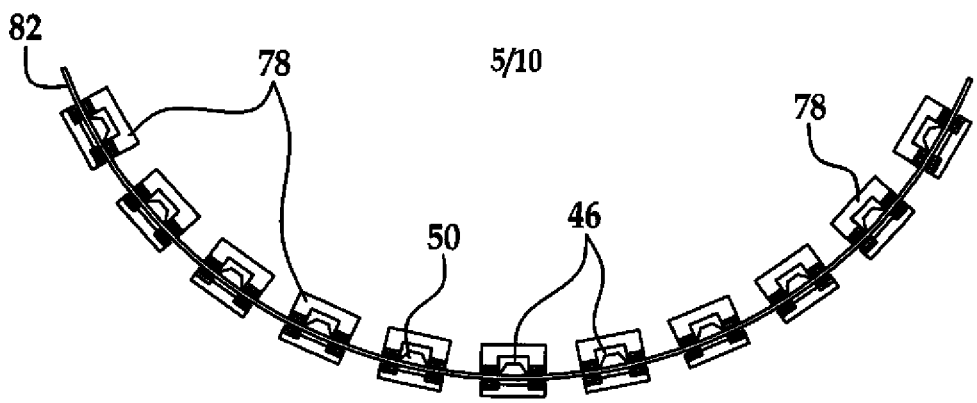
FIG. 12 is a sectional view of an aircraft fuselage skin illustrating the use of multiple clamps used to cocure multiple staged stringers with the skin.

Attention is now directed to FIG. 12 which illustrates a plurality of the compression molds 78 that may be used to cocure stringers 46 with a curved, uncured laminate skin 82. Since the hat section 50 has already been cured, the stringers 46 possess sufficient rigidity to allow them to be positioned and located on the skin 82, following which the flanges 50 of the stringers 46 may be cocured with the skin 82.

Figure 13:
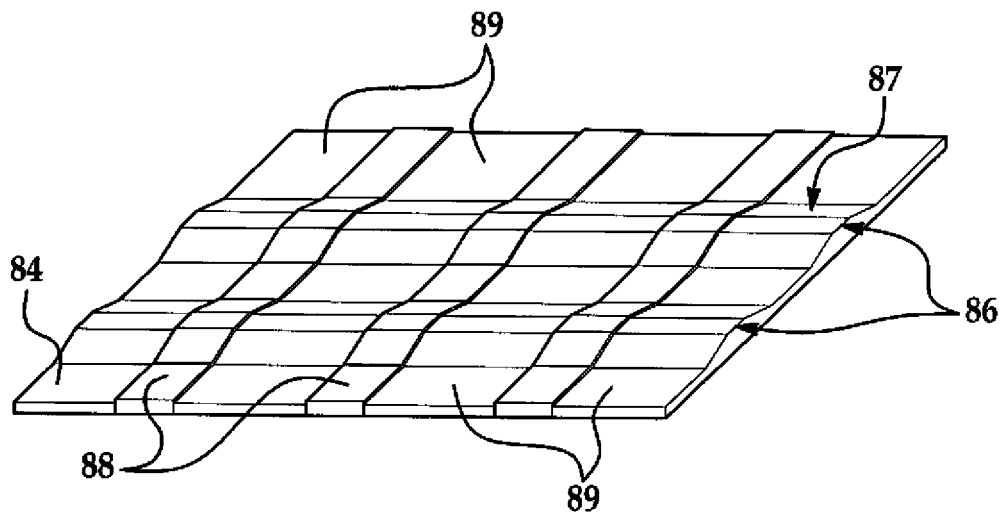
FIG. 13 is a perspective illustration of a partially cured skin component having staged areas and an uneven surface.
Figure 14:
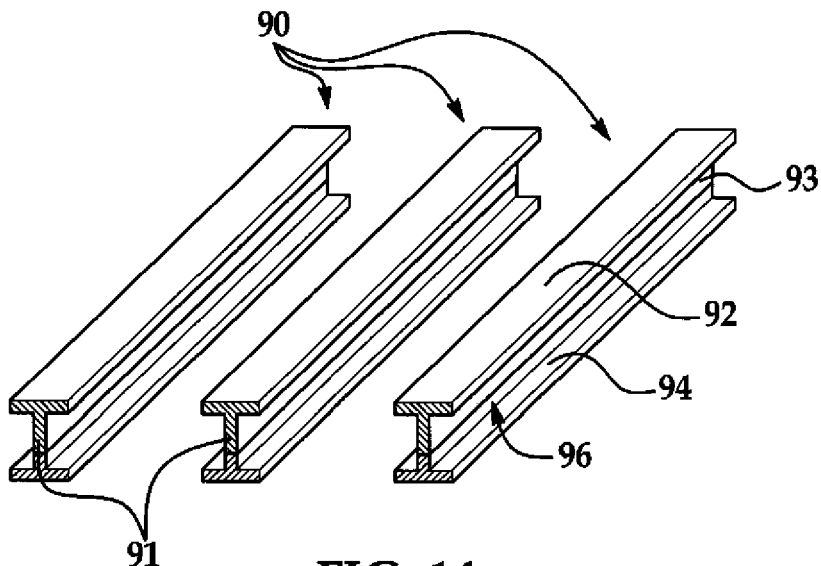
FIG. 14 is a perspective view illustrating composite I-beams that have been staged in preparation for cocuring with the skin shown in FIG. 13.
Figure 15:
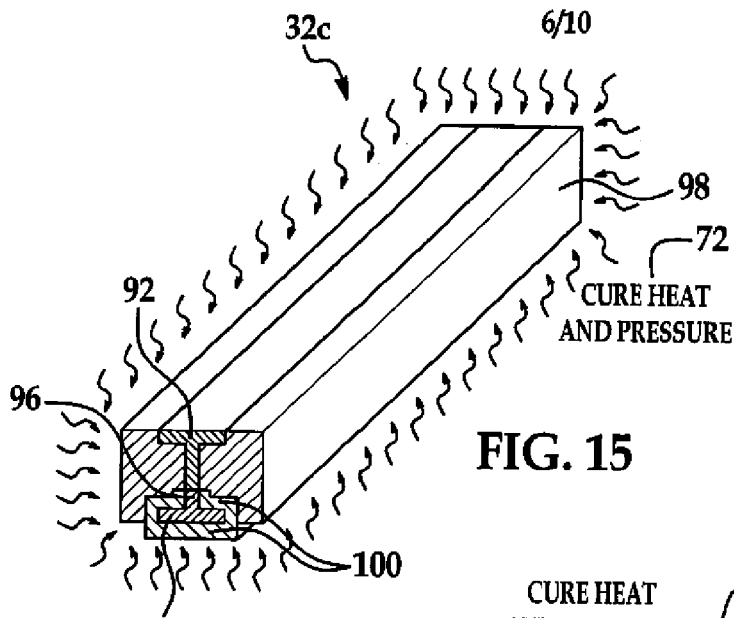
FIG. 15 is a perspective view illustrating cure tooling used to stage the beams shown in FIG. 14.

FIG. 13 illustrates a skin 84 which may include undulations 86 presenting an uneven skin surface 87. In this case, the skin 84 may be formed and staged using an appropriate cure tool 32 (FIG. 1) which forms the uneven skin surface 87 and cure portions 89 of the skin 84 while leaving strips 88 of the skin 84 staged. FIG. 14 illustrates I-beams 90 that are to be joined to the uneven skin surface 87 shown in FIG. 13. In this case, cure tools are used to form and cure portions of the I-beam 90, including an upper flange 92 and upper portions 91 of a web 93. In this case, however, lower portions 96 of the web 93 as well as a lower flange 94 are consolidated by staging. The beams 90 may be stage consolidated using the cure tool 32c shown in FIG. 15. The cure tool 32c includes a mold body 98 used to consolidate and cure the upper flange 92 and web 93. A thermal sink embedded in the lower face of the mold body 98 may be used to form a lower portion 96 of the web 93 and the lower flange 94, while isolating these features from cure heat 72 used to cure the upper portion of the web 93 and the upper flange 92. In some embodiments of this invention, the entire I-beam 90 may be staged (rather than fully cured) so that the entire beam 90 may later be reformed in the manner described herein.

Figure 16:
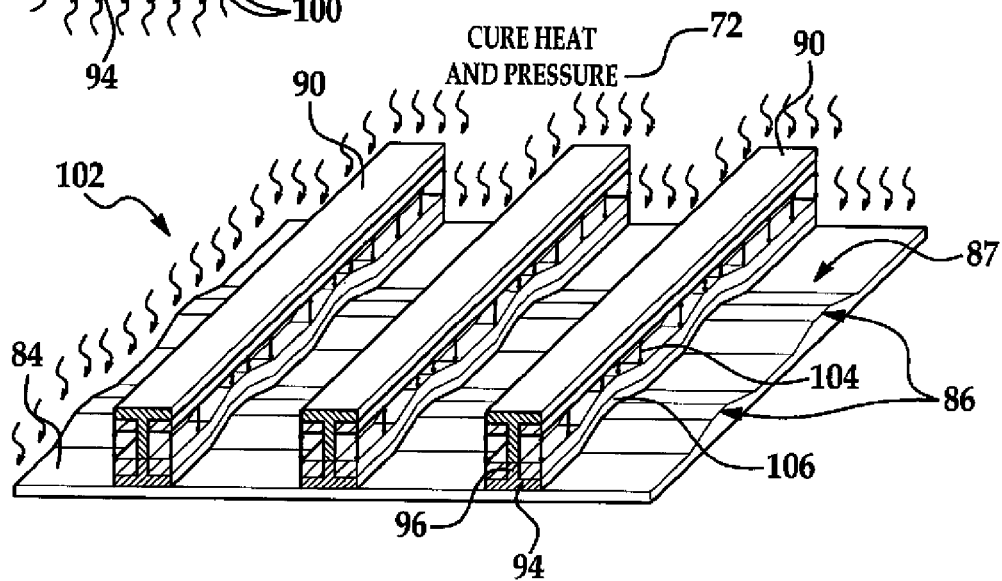
FIG. 16 is a perspective view illustrating cocuring of the staged beams shown in FIG. 14 with the skin illustrated in FIG. 13, and demonstrating the compliance of the beams' flange to the irregular surface of the skin.
Figure 17:
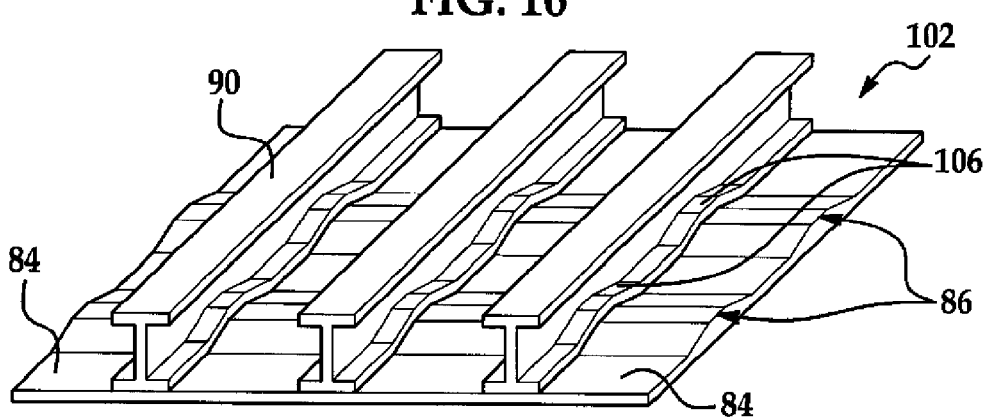
FIG. 17 is a view similar to FIG. 16, but showing the assembly having been fully cocured.
Figure 22:
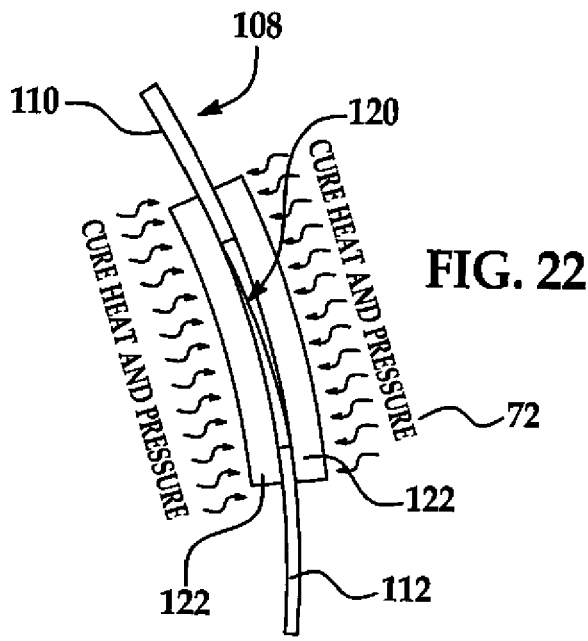
FIG. 22 is a sectional view illustrating the assembly shown in FIG. 21 having been placed in tooling used to cocure the assembled skin components.

FIG. 16 illustrates the staged beams 90 having been aligned and placed on the uneven surface 87 of the skin 94 in preparation for cocuring. During the application of heat and pressure 72, the uncured lower flange 94 and lower portion 96 of the web 93 deform as shown by the arrows 104 so as to conform to the uneven surface 91 of the skin 84. The lower face of the lower flange 94 overlies and is aligned with the uncured or staged areas 88 of the skin 84 shown in FIG. 13, and these two mating surfaces are then cocured using a suitable cocure tool or vacuum bag (not shown). The final cocured assembly 102 comprising the beams 90 and the skin 84 is shown in FIG. 17 wherein the lower flange 106 conforms to the undulations 86 and is joined to the uneven surface 91 of the skin 84 substantially along the entire length of the beam 90.

Referring now to FIGS. 18 and 19, the method may be employed to join a pair of curved laminate skin sections 110, 112 along a scarf joint 114. The skin sections 110, 112 may form, for example and without limitation, a portion of a barrel shape fuselage (not shown). As shown in FIGS. 20 and 21, a layup of a skin section 110 may be placed in a cure mold 118 with the tapered edge 110a in contact on one or both surfaces with a thermal sink 116. The application of heat and pressure 72 results in curing of the skin section 110 except along the edge 110a which has been staged when the skin section 110 is removed from the cure mold 118. After the skin sections 110, 112 are staged as described above, they may be assembled, as shown in FIG. 21 in which the tapered outer edges 110a, 112a are brought into overlapping, face-to-face contact. To apply cure pressure 72 to the spliced area 120, the assembly 108 is then placed in an accurate cocuring mold 122, thereby bringing the edges to a full cure 110a, 112a to form a seamless join between the skin sections 110, 112.

Figure 23:
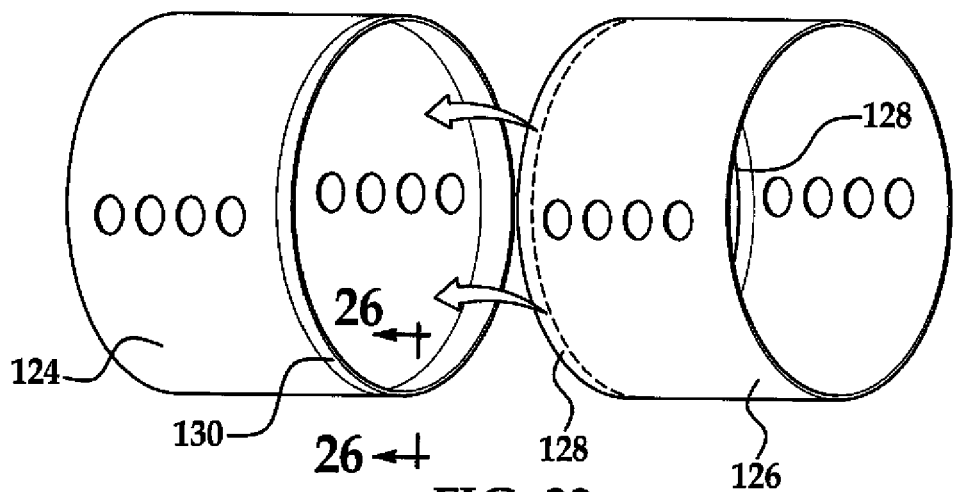
FIG. 23 is a perspective illustration of two fuselage sections having selectively staged areas that may be assembled and cocured along their mating edges.
Figure 24:
FIG. 24 is a sectional view illustrating how the edges of the fuselage sections shown in FIG. 23 may be staged for subsequent cocuring.
Figure 25:
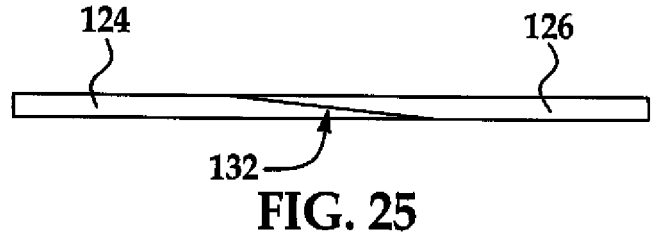
FIG. 25 is a sectional view illustrating a fully cured spliced joint formed between the edges of the fuselage sections shown in FIG. 24.

Referring now to FIG. 23, in some applications it may be possible to co-bond large composite components, such as the barrel shaped fuselage sections 124, 126 used to fabricate an aircraft fuselage. Each of the fuselage sections 124, 126 is cured such that adjoining edges 128, 130 staged until the fuselage sections 124, 126 are assembled. FIGS. 24 and 25 illustrate a scarf joint 132 that may be employed to create a cocured joint between the fuselage sections 124, 126 along their adjoining edges 128, 130. As shown in FIG. 24, following curing of the fuselage sections 124, 126, the staged outer edges 128, 130 are aligned and then brought into face-to-face contact to form a splice joint 132. A cocuring mold (not shown) is then placed on opposite surfaces of the splice joint 132 in order to cocure the edges 128, 130 thereby consolidating the joint 132 to join the fuselage sections 124, 126 around the entire circumference.

Figure 26:
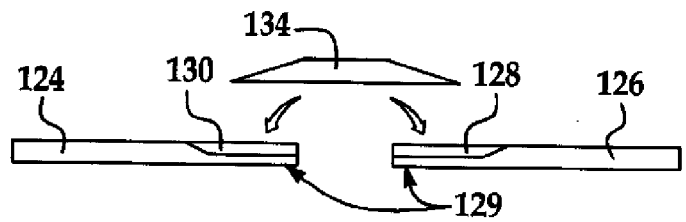
FIG. 26 is a sectional view illustrating an alternate method of splicing the edges of the fuselage sections shown in FIG. 23.
Figure 27:
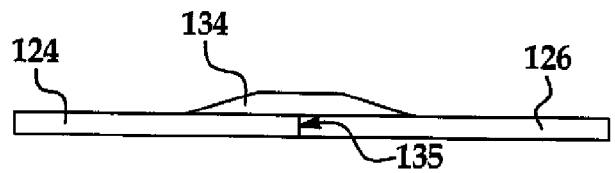
FIG. 27 is a sectional view illustrating the splice formed using the method shown in FIG. 26 after cocuring.

FIGS. 26 and 27 illustrate an alternate form of a splice between the outer edges 128, 130 of the fuselage sections 124, 126. In this example, the outer edges 128, 130 may remain staged only to a limited depth while areas 129 along the edges 128, 130 may be fully cured. The underlying cured areas 129 assure that the edges 128, 130 remain substantially rigid during the assembly process, and thus assuring proper alignment around the entire circumference of the fuselage sections 124, 126. A staged splice member 134 is placed over a butt joint 135 formed when the edges 128, 130 are brought into abutment with each other. The staged areas of the edges 128, 130 are then cocured with the splice member 134 to form a consolidated and reinforced butt joint 135, as shown in FIG. 27.

In each of the examples described above, it should be noted that various alternate processes may be employed in which one surface may remain uncured (no prior staging) while the other surface is staged to a predetermined level. For example, and without limitation, the splice member 134 may instead remain uncured prior to the final temperature cycle, which brings the structure to a full cure.

Figure 28:
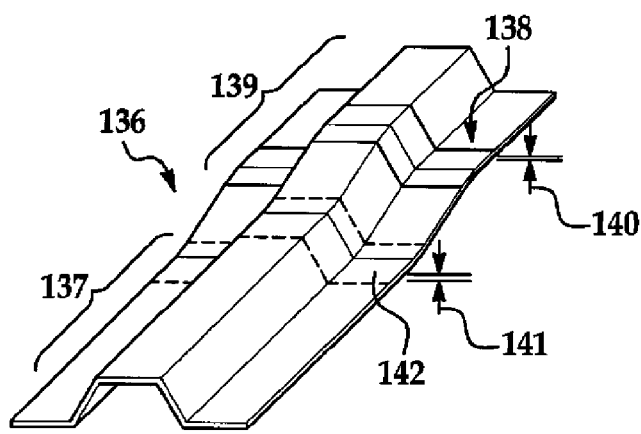
FIG. 28 is a perspective view illustrating a stringer having staged portions in transition areas along its length.

Attention is now directed to FIG. 28 which illustrates a process for forming a staged stringer 136 with uncured areas 138 and 142. In this example, the stringer 136 is staged, except that thermal sinks (not shown) are placed in contact with the surfaces 138 and 142 where forming will occur. Following staging, the stringer 136 will be formed to various contours by applying heat and pressure (not shown) while the stringer 136 is in contact with a mold set, a mold and vacuum bag, a caul plate and vacuum bag, or against the surface of a mating component (not shown). It may thus be appreciated that the portions of the staged stringer 138, 142 along its length will provide the stringer 136 with sufficient rigidity to maintain its shape during forming. Once formed, the staged stringer 136 is ready for cocuring with mating component(s), including wherein other portions of the area 138, 142 located along a width of the staged stringer 136 not contacting the mating component(s) are brought to a full cure during cocuring.

Figure 29:
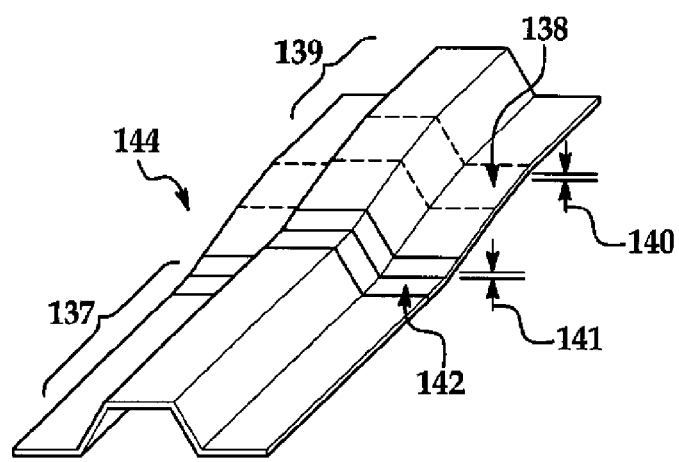
FIG. 29 is a view similar to FIG. 28 in which the stringer has been staged in the other transition areas in order to stabilize regions where ply wrinkling may occur.
Figure 30:
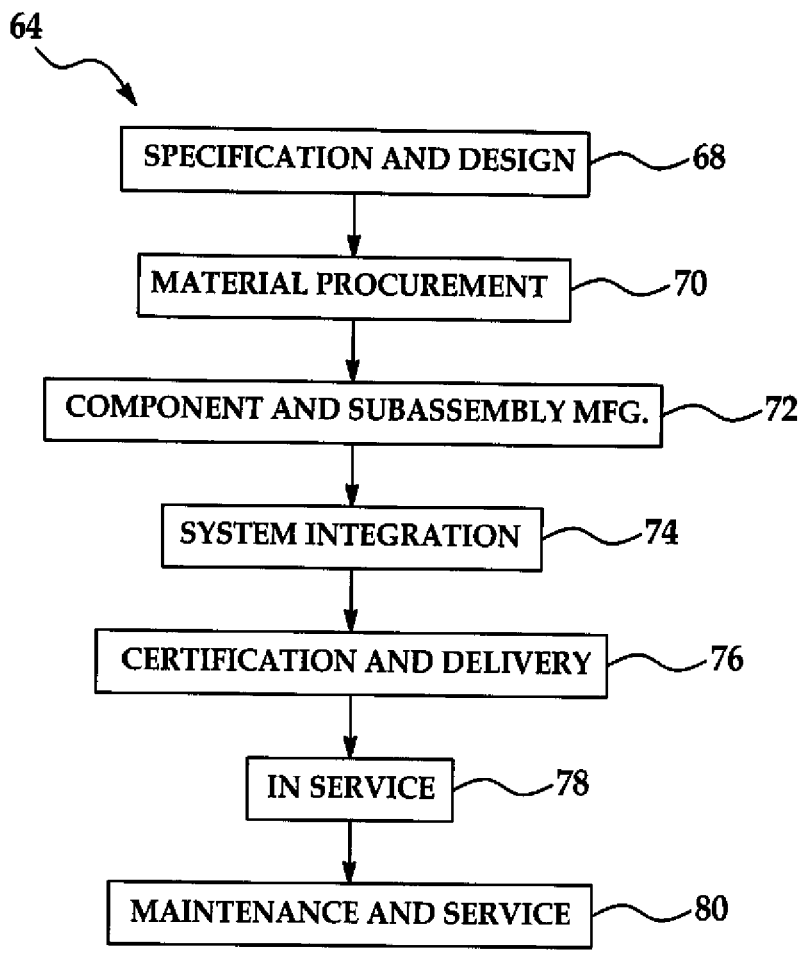
FIG. 30 is a flow diagram of aircraft production and service methodology.
Figure 31:
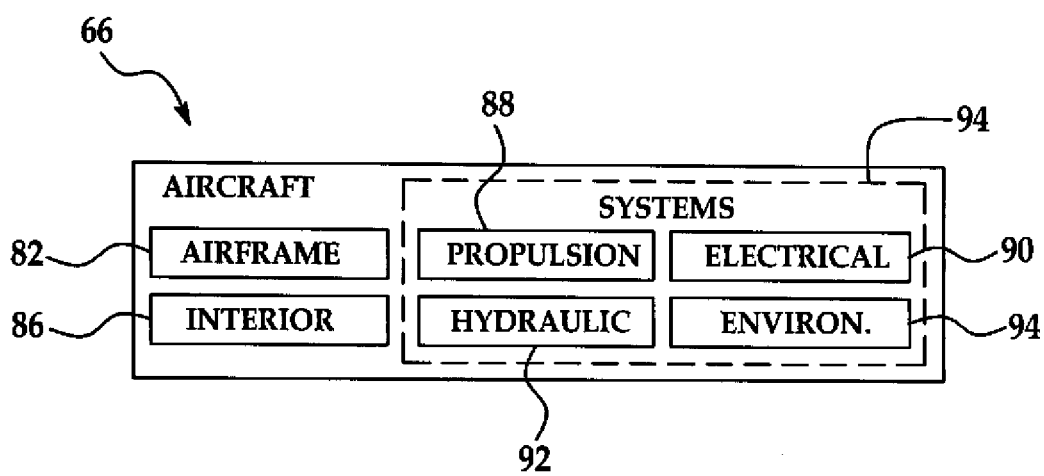
FIG. 31 is a block diagram of an aircraft.

FIG. 29 illustrates another method to form a stepped stringer 144 similar in shape to stringer 136 using the staging process. In this example, the stringer 144 is uncured, except that heat (not shown) is applied to the surfaces 140 and 141 where forming will occur in order to stage only these areas. Following staging, the stringer 144 is formed to any of various contours by applying heat and pressure (not shown) while the stringer is in contact with a mold set, a mold and vacuum bag, a caul plate and vacuum bag, or against the surface of a mating component (not shown). It may thus be appreciated that the staged portions of the uncured stringer 138, 142 will be providing the formed areas of the stringer 144 with sufficient rigidity to maintain its shape during forming. Once formed, the staged stringer is ready for cocuring with mating component(s).

What is claimed is:

1. A method of fabricating a composite structure, comprising:
   forming a first composite layup and a second composite layup;
   staging at least a first portion of the first composite layup and a first portion of the second composite layup by partially curing each of the first portion of the first composite layup and the first portion of the second composite layup to a stage in which the first portion of the first composite layup and the first portion of the second composite layup are each substantially rigid but less than fully cured, with a second portion of the first composite layup and a second portion of the second composite layup each being fully cured;
   subsequently, assembling the layups, including using fully cured second portions of the first composite layup and the second composite layup as reference surfaces to locate the first composite layup relative to the second composite layup, bringing the first portion of the first composite layup into contact with the second composite layup and bringing the first portion of the second composite layup into contact with the first composite layup; and
   subsequently, cocuring the first portion of the first composite layup with the first portion of the second composite layup, including wherein other portions of the first composite layup other than the first portion located along a width of the first composite layup are brought to a full cure without cocuring the other portions to the second composite layup.

2. The method of claim 1, wherein staging the first composite layup includes:
   heating the first composite layup to a first temperature sufficient to cure the second portion of the first composite layup, and
   limiting heating of the first portion to a second temperature below a temperature sufficient to result in a full cure of the first portion.

3. The method of claim 2, wherein limiting heating of the first portion of the first composite layup comprises controlling an amount of staging of the first portion by placing at least one thermal control element in contact with the first portion.

4. A method of fabricating a composite structure, comprising:
   staging a first portion of a first composite component, initially uncured, by curing the first portion to an intermediate cure state in which the first portion acts as a vitreous solid at substantially room temperature but is not fully cured, the first portion being less than a first entirety of the first composite component;
   staging a second portion of a second composite component, initially uncured, by curing the second portion to the intermediate cure state in which the second portion acts as the vitreous solid at substantially room temperature but is not fully cured, the second portion being less than a second entirety of the second composite component;
   assembling the first composite component with the second composite component using fully cured portions of the first composite component and the second composite component as reference surfaces to locate the first composite component relative to the second composite component; and,
   cocuring the first portion of the first composite component and the second portion of the second composite component, including wherein other portions of the first composite component other than the first portion located along a width of the first composite component are brought to a full cure without cocuring the other portions to the second composite component.

5. The method of claim 4, further comprising:
   after assembling, heating the first portion until the first portion is substantially consolidated and plastically deforms to conform to the second composite component.

6. The method of claim 4, wherein cocuring is performed by placing thermal control elements on the first portion and the second portion.

7. The method of claim 6, wherein cocuring includes placing at least one thermal control element in contact with the first portion of the first composite component.

8. A method of reinforcing a skin comprising a composite, the method comprising:
   curing the skin such that:
      a first portion of the skin reaches a first state being fully cured; and
      a second portion of the skin reaches a second state partially cured such that the second portion of the skin may be cocured;

curing a layup comprising a multi-ply composite such that:
- a first portion of the layup reaches the first state; and
- a second portion of the layup reaches the second state;

subsequently, aligning the second portion of the skin adjacent to the second portion of the layup using fully cured first portions of the skin and the layup as reference surfaces to locate the skin relative to the layup;

reinforcing the skin by forming a unified structure comprising the skin cocured to the layup by cocuring the second portion of the skin to the second portion of the layup, including wherein other portions of the layup other than the second portion located along a width of the layup are brought to a full cure without cocuring the other portions to the skin.

9. The method of claim 8, wherein aligning comprises using a cocuring tool and compression mold.

10. The method of claim 8, wherein the unified structure is fully cured.

11. The method of claim 8, wherein curing the second portion of the skin comprises using a thermal control element.

12. The method of claim 8, wherein curing the second portion of the layup comprises using a thermal control element.

13. The method of claim 8, wherein the layup comprises a stringer.

14. The method of claim 8, wherein the layup comprises a second skin.

15. The method of claim 8, further comprising the skin being undulated.

* * * * *